J. W. BREYFOGLE.
TRANSMISSION MECHANISM.
APPLICATION FILED JUNE 8, 1906.
973,339.
Patented Oct. 18, 1910.
2 SHEETS—SHEET 1.
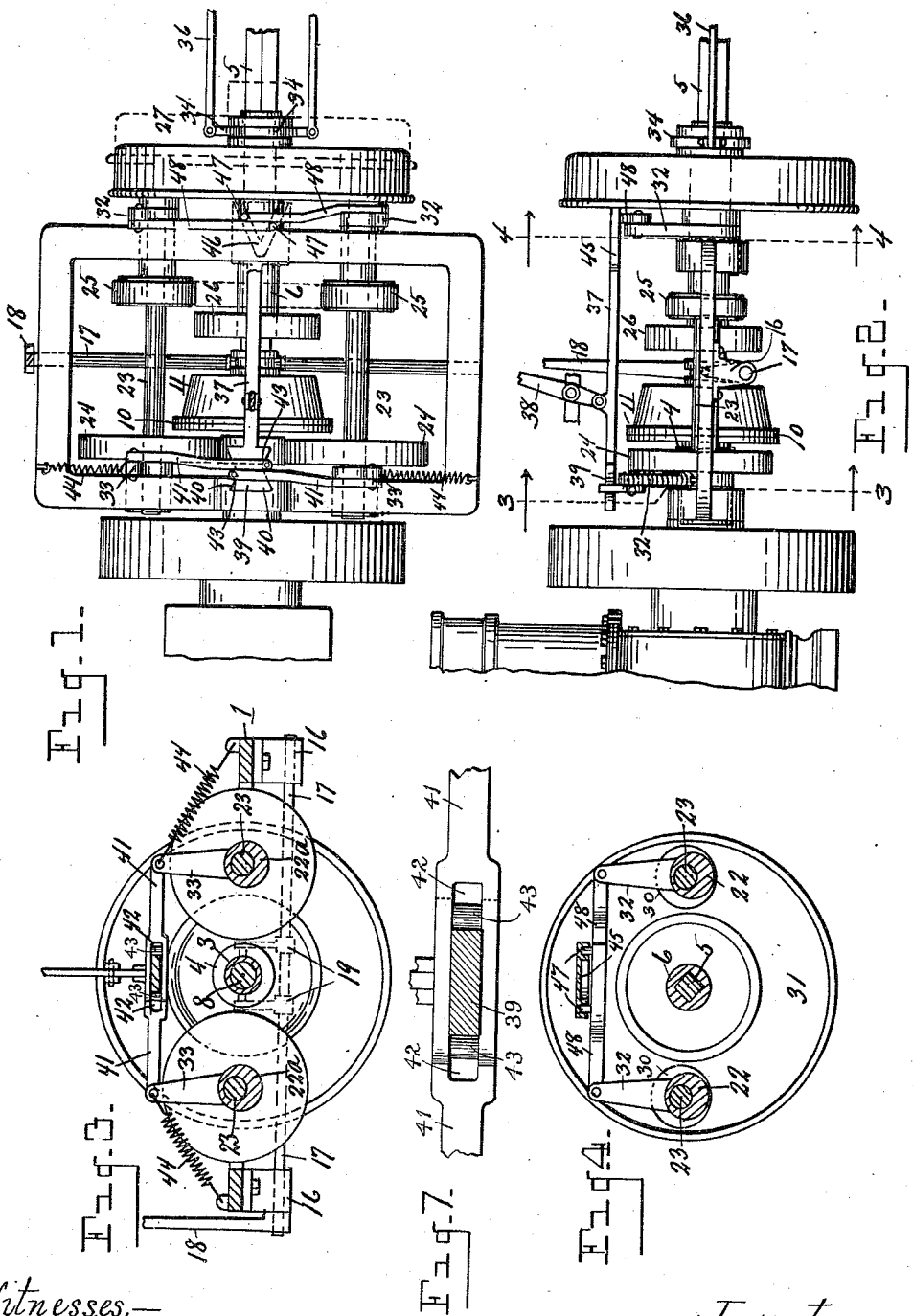

J. W. BREYFOGLE.
TRANSMISSION MECHANISM.
APPLICATION FILED JUNE 8, 1906.

973,339.

Patented Oct. 18, 1910.

2 SHEETS—SHEET 2.

Witnesses.
O. B. Baenziger.
I. G. Howlett.

Inventor.
John W. Breyfogle.
By E. A. Wheeler & Co., Attys.

UNITED STATES PATENT OFFICE.

JOHN W. BREYFOGLE, OF ROCHESTER, NEW YORK, ASSIGNOR TO GEARLESS TRANSMISSION CO., OF ROCHESTER, NEW YORK, A CORPORATION OF NEW YORK.

TRANSMISSION MECHANISM.

973,339.   Specification of Letters Patent.   Patented Oct. 18, 1910.

Application filed June 8, 1906. Serial No. 320,701.

*To all whom it may concern:*

Be it known that I, JOHN W. BREYFOGLE, a citizen of the United States, residing at Rochester, in the county of Monroe, State of New York, have invented certain new and useful Improvements in Transmission Mechanism; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a slidable gear friction transmission mechanism, and consists in the construction and arrangement of parts hereinafter fully set forth and pointed out particularly in the claims.

The object of the invention is to provide simple and efficient means for transmitting power directly from the motor shaft to the driven shaft to attain high speed and indirectly through friction wheels to attain an indirect drive at variable speeds, and to reverse the motion of the driven shaft.

The above object is attained by the structure illustrated in the accompanying drawings, in which:—

Figure 6:
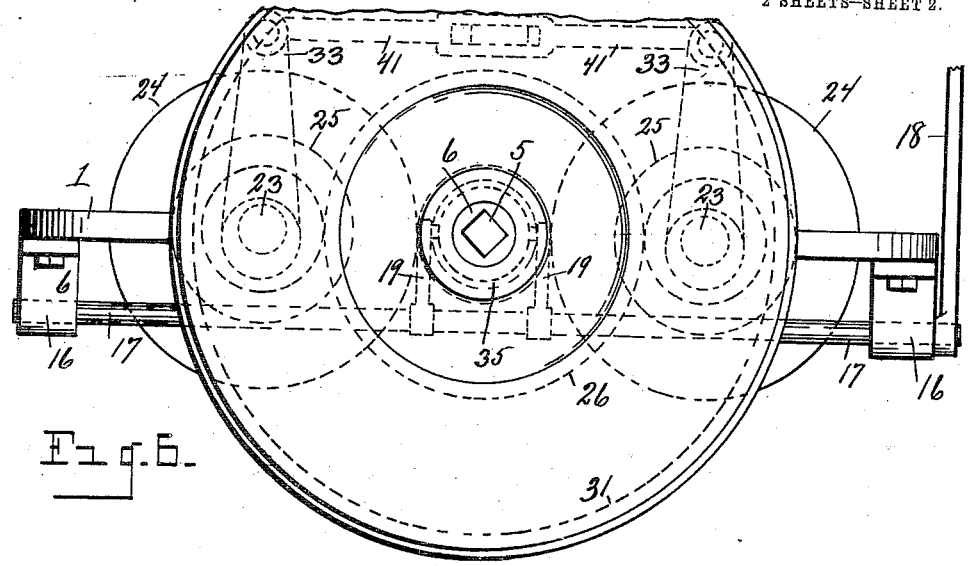
Figure 5:
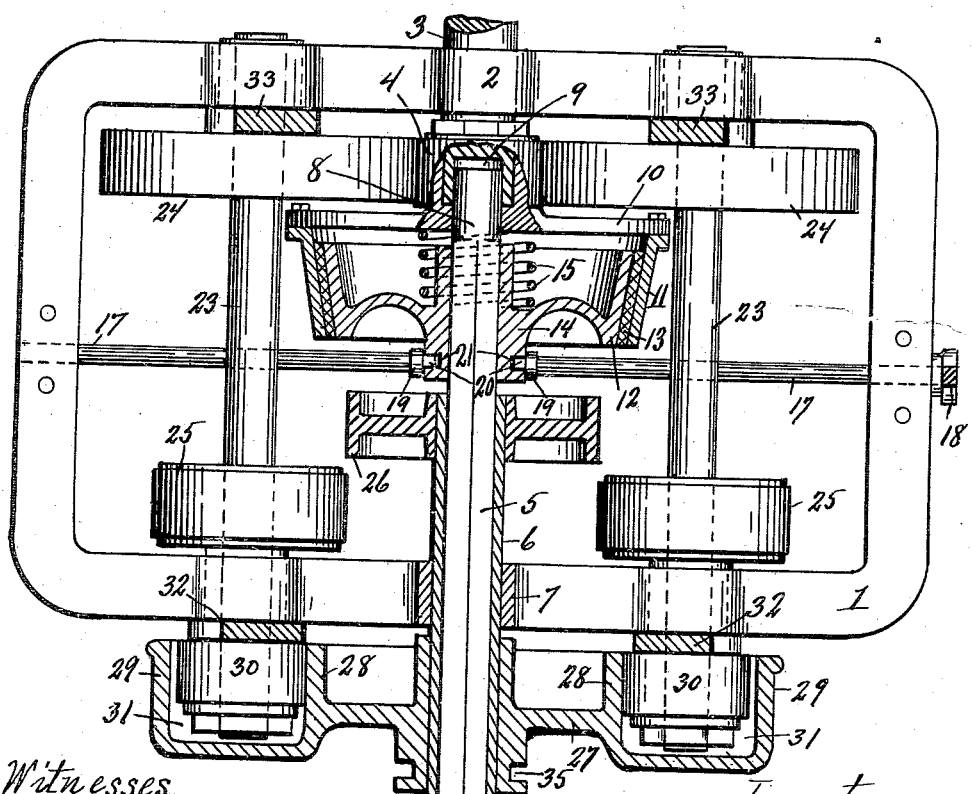

Figure 1 is a plan view of transmission mechanism involving my invention. Fig. 2 is a side elevation thereof. Fig. 3 is a transverse section as on line 3—3 of Fig. 2. Fig. 4 is a similar section as on line 4—4 of Fig. 2. Fig. 5 is a view, partly in horizontal section, through the transmission mechanism. Fig. 6 is an end elevation of said mechanism. Fig. 7 is an enlarged fragmentary view of the antifriction rollers journaled in the outer ends of the slots in the lapping ends of the connecting rods through the medium of which a portion of the operative mechanism may be actuated.

This transmission mechanism is especially designed for the propulsion of motor vehicles, and is shown mounted in a suitable frame adapted to be installed in a motor driven vehicle.

Referring to the characters of reference, 1 designates the frame in which the transmission mechanism is mounted, at one side of which is a bearing 2 for the shaft 3 of the engine or motor. Fixed on the inner end of shaft 3 is a friction wheel 4. The driven shaft 5 is square for the greater portion of its length and is embraced by a slidable sleeve 6 which is journaled in a suitable bearing 7 at the opposite side of said frame. The inner end of shaft 5 is rounded, as shown at 8, and is journaled in the inner end of shaft 3 which is provided with a socket to receive it, as shown at 9 in Fig. 5. Fast to the inner end of the motor shaft and rotatable therewith is a disk 10. Bolted to the side of said disk is a tapering flange 11. Lying within said flange is a clutch cone 12 having a friction surface 13, said cone having a hub 14 which loosely embraces the shaft 5 so as to slide thereon. Confined between the hub of the friction cone and the disk 10 is a coiled spring 15, the tension of which is normally exerted to keep the friction surface of the cone in contact with the inner wall of the tapering flange of the disk 10, thereby locking the disk and cone together and directly connecting the shafts 3 and 5. Crossing below the frame and suitably journaled in hangers 16 is a rock shaft 17 on the end of which is a lever 18. Projecting upwardly from said shaft are the opposed arms 19 carrying the inwardly projecting pins 20 which lie in the peripheral channel 21 of the hub 14 of the friction cone. By a movement of the lever 18, the shaft 17 may be rocked to separate the friction cone from the tapered flange 11, thereby disconnecting the shafts 3 and 5, which operation is essential when driving indirectly through the friction wheels as hereinafter described.

Standing parallel with the driving and driven shafts and journaled in eccentric bearings 22 and 22ᵃ mounted in the frame are the counter-shafts 23, each of said shafts having upon one end thereof a large friction wheel 24 and each having mounted thereon near their other ends a relatively small friction wheel 25. The diameter of the wheels 24 is such as to cause their peripheries to normally stand close to the periphery of the wheel 4 on the motor shaft. Upon the inner end of the sleeve 6 is a friction wheel 26 and upon the outer end of said sleeve is a friction wheel 27 having an inner flange 28 and an outer flange 29. The ends of the shafts 23 extend beyond the frame and carry the friction wheels 30 which are adapted to lie within the annular recess 31 between the flanges 28 and 29 of the wheel 27, all of which is clearly shown in Fig. 5.

Connected with the eccentric bearings 22 are the crank arms 32 and connected with the eccentric bearings 32ª are the crank arms 33. By a movement of said crank arms, the eccentric bearings 22 and 22ª are rolled in their boxes so as to shift the shafts 23 laterally for purposes hereinafter explained.

As before stated, the sleeve 6 is adapted to slide longitudinally of the square shaft through the bearing 7 and is rotatable with said shaft. To slide said sleeve, a yoke 34 is made to engage in the groove 35 of the hub of the wheel 27 to which is connected the actuating rods 36 which may be reciprocated in any suitable manner to slide the sleeve 6 upon the shaft 5.

When it is desired to drive the vehicle at a slower speed than that afforded by the direct drive, as when starting the car or vehicle, the clutch which connects the driving and driven shafts is disconnected and the arms 32 and 33 of the eccentric bearings 22 and 22ª respectively are actuated to carry the shafts 23 toward each other, thereby causing the wheels 24 to engage the small interposed wheel 4 on the driving shaft and the wheels 30 to engage the outer face of the flange 28 of the wheel 27, whereby the driven shaft 5 will be rotated through the wheels 4, 24, 30, 27 and the sleeve 6, affording slow speed ahead. Should it be desired to reverse the movement of the car or vehicle, the crank arms 32 are actuated to separate the ends of the shafts 23 carrying the wheels 30 and throw said wheels into engagement with the inner face of the outer flange 29 of the wheel 27, thereby reversing the movement of said wheel and the shaft 5.

To drive the car or vehicle forward through the medium of the friction wheels at a rate of speed faster than that afforded by contact of the wheels 30 with the flange 28 of the wheel 27, the sleeve 6 is shifted longitudinally of the shaft to carry the wheel 26 thereon into position between the wheels 25, as shown by dotted lines in Fig. 1, which movement carries the flanges of the wheel 27 out of the path of the wheels 30, whereby upon a movement of the eccentric bearings 22 and 22ª to carry the shafts 23 toward each other and cause the wheels 24 to engage the wheel 4 on the driving shaft and the wheels 25 to engage the wheel 26 of the sleeve 6 upon the driven shaft, said shaft will be turned through said train of friction wheels and the vehicle propelled forward at the fastest speed afforded through the medium of the friction wheels.

To provide for actuating the crank arms 32 and 33 of the eccentric bearings of the shafts 23, a reciprocatory bar 37 is employed which is operated through the medium of a suitable lever 38. At one end of said bar is a cam plate 39 whose opposite margins are inwardly beveled in opposite directions to describe an obtuse angle, as shown at 40. Attached to the upper ends of the levers 33 are the connecting rods 41 whose inner ends lap and are provided with slots 42 that receive the cam plate 39. Journaled in the outer ends of the slots 42 are the antifriction rollers 43 as clearly shown in Fig. 7. Attached to the crank arms 33 to retain them in a neutral position are the coiled springs 44 whose tension is normally exerted to hold the antifriction roller 43 in engagement with the opposed beveled margins of the cam plate 39. By this arrangement a movement of the cam plate in either direction through the slotted openings in the connecting rods, will draw upon said rods to swing the crank arms 33 inwardly and rock the eccentric bearings to carry the wheels 24 into engagement with the wheel 4 on the driving shaft. At the opposite end of the reciprocatory bar is a plate 45 having therein a V-shape cam way 46. Engaging in said cam way are the pins 47 mounted in the opposite ends of the rods 48 which are pivoted to the crank arms 32 of the eccentric bearings 22. As the bar 37 reciprocates, the pins 47 travel in the V-shape cam way 46, thereby actuating the connecting rods 48 longitudinally. It will be understood that while a movement of the bar 37 in either direction will draw upon the rods 41 to carry the wheels 24 into engagement with the wheel 4, a movement of said bar to the right with reference to Figs. 2 and 3, will extend the connecting rods 48 to actuate the eccentric bearings 22 and carry the wheels 30 into engagement with the flange 29 of wheel 27, while a movement of the bar 37 to the left will draw upon said rods 48 to actuate said eccentric bearings in the opposite direction and carry the wheels 30 into engagement with the flange 28 of the wheel 27. It will therefore be seen that a movement of the bar 37 in either direction will always actuate the eccentric bearings 22ª to carry the wheels 24 into engagement with the wheel 4 and drive the shafts 23, while a movement of said bar in one direction will carry the wheels 30 on said shafts into engagement with the flange 28 of the wheel 27, and a movement of said bar in the opposite direction will carry said wheels 30 into engagement with the flange 29 of said wheel.

Having thus fully set forth my invention, what I claim as new and desire to secure by Letters Patent, is:—

1. In a transmission mechanism, the combination with the motor shaft, of the driven shaft, means for coupling said shafts to drive them in unison and for disconnecting said shafts to enable them to rotate independently, a friction wheel on the driven shaft having opposed friction surfaces, a counter shaft receiving power from the motor shaft, lying parallel therewith and movable transversely, a wheel on said transversely movable shaft and means for moving said shaft to carry said wheel into engagement with either of the friction surfaces of the wheel on the driven shaft to drive said wheel and shaft in opposite directions at variable speeds.

2. In a transmission mechanism, the combination of the motor and driven shafts, in axial alinement, means for directly connecting said shafts, a counter shaft receiving power from the motor shaft, a friction wheel on the driven shaft having friction surfaces of different diameters, a friction wheel on the counter shaft adapted to engage either of said surfaces and means for moving the counter shaft to carry the friction wheel thereon into frictional contact with either of the friction surfaces of the wheel on the driven shaft.

3. In a transmission mechanism, the combination of the motor and driven shafts, a counter shaft receiving power from the motor shaft, a friction wheel on the driven shaft having friction surfaces of different diameters, a friction wheel on the counter shaft adapted to engage either of said surfaces, means for moving the countershaft to carry the friction wheel thereon into frictional contact with either of the friction surfaces of the wheel on the driven shaft, and means for coupling said motor and driven shafts to cause them to turn in unison.

4. In a transmission mechanism, the combination of the motor and driven shafts, a counter shaft receiving power from the motor shaft, a friction wheel on the driven shaft, means for imparting power from the counter shaft directly to said friction wheel to turn said wheel in opposite directions at variable speeds, means for disconnecting the counter shaft from the friction wheel on the driven shaft, and means for coupling the driven and motor shafts to cause them to turn in unison.

5. In a transmission mechanism, the combination with the motor and driven shafts, of a counter shaft receiving power from the motor shaft, two friction wheels on the driven shaft slidable in unison thereon, one having opposed friction surfaces, a friction wheel on the counter shaft engageable with either of said friction surfaces, a second friction wheel on the counter shaft adapted to engage the periphery of the other of said slidable wheels on the driven shaft, means for sliding said friction wheels in unison, and means for effecting frictional contact between the wheels on the counter shaft and the friction surfaces of the slidable wheels on the driven shaft.

6. In a transmission mechanism, the combination with the motor and driven shafts, of a counter shaft receiving power from the motor shaft, two friction wheels on the driven shaft slidable in unison thereon, one having opposed friction surfaces, a friction wheel on the counter shaft engageable with either of said friction surfaces, a second friction wheel on the counter shaft adapted to engage the periphery of the other of said slidable wheels on the driven shaft, means for sliding said friction wheels in unison, means for effecting frictional contact between the wheels on the counter shaft and the friction surfaces of the slidable wheels on the driven shaft, means for disconnecting the counter shaft from the motor shaft, and means for connecting the motor and driven shafts to cause them to turn in unison.

7. In a transmission mechanism, the combination of the motor shaft and the driven shaft rotatable independently, means for connecting said shafts to drive them in unison, a sleeve slidable upon the driven shaft and rotatable therewith, means for sliding said sleeve, a relatively large friction wheel on one end of said sleeve having plural friction surfaces, a relatively small friction wheel on the other end of said sleeve, a shaft parallel with the driven shaft receiving power from the motor shaft, a relatively large friction wheel on the counter shaft adapted to engage the friction wheel at the inner end of said sleeve, and a relatively small friction wheel on said counter shaft adapted to engage one at a time the plural friction surfaces of the friction wheel on the outer end of said sleeve, and means for moving the counter shaft transversely.

8. In a transmission mechanism, the combination of the motor and driven shafts, a counter shaft receiving power from the motor shaft, a friction wheel slidable on the driven shaft having friction surfaces of different diameters, a friction wheel on the counter shaft adapted to engage either of said surfaces, means for moving the counter shaft to carry the friction wheel thereon into frictional contact with either of the friction surfaces of the wheel on the driven shaft, and means for sliding the wheel on the driven shaft to carry its friction surface out of the plane of said friction wheel on the counter shaft.

9. In a transmission mechanism, the combination with the motor and driven shafts, of counter shafts receiving power from the motor shaft disposed on opposite sides thereof, two friction wheels on the driven shaft slidable in unison thereon, one having opposed friction surfaces, friction wheels on the counter shafts engageable with either of said friction surfaces, a second friction wheel on each of the counter shafts adapted to engage the periphery of the other of said slidable wheels on the driven shaft, means for sliding said friction wheels on the driven shaft in unison, and means for effecting frictional contact between the wheels on the counter shafts and the friction surfaces of the slidable wheels on the driven shaft.

10. In a transmission mechanism, the combination of the motor and driven shafts, counter shafts receiving power from the motor shaft and disposed on opposite sides parallel with said shafts, a clutch device for connecting and disconnecting said shafts, the point of application of power to the counter shafts being upon the motor side of said clutch, friction wheels on the counter shafts, a friction wheel on the driven shaft to which power is applied from the friction wheels on the counter shafts, said friction wheel on the driven shaft being movable into and out of contact with the friction wheels on the counter shafts, whereby the driven shaft may be driven indirectly around said clutch.

In testimony whereof I sign this specification in the presence of two witnesses.

JOHN W. BREYFOGLE.

Witnesses:
    GEORGE D. WILCOX,
    GRACE V. WINSTANDLEY.